(12) United States Patent
Iwai et al.

(10) Patent No.: US 9,913,105 B2
(45) Date of Patent: *Mar. 6, 2018

(54) COMMUNICATION SYSTEM, SERVICE PLATFORM, COMMUNICATION METHOD, AND NON-TRANSITORY COMPUTER READABLE MEDIUM

(71) Applicant: NEC Corporation, Tokyo (JP)

(72) Inventors: Takanori Iwai, Tokyo (JP); Norio Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 133 days.

This patent is subject to a terminal disclaimer.

(21) Appl. No.: 14/771,560

(22) PCT Filed: Feb. 3, 2014

(86) PCT No.: PCT/JP2014/000543
§ 371 (c)(1),
(2) Date: Aug. 31, 2015

(87) PCT Pub. No.: WO2014/132563
PCT Pub. Date: Sep. 4, 2014

(65) Prior Publication Data
US 2016/0007166 A1 Jan. 7, 2016

(30) Foreign Application Priority Data
Mar. 1, 2013 (JP) .................. 2013-041045

(51) Int. Cl.
*H04H 20/71* (2008.01)
*H04W 4/06* (2009.01)
*H04W 4/00* (2018.01)

(52) U.S. Cl.
CPC ............. *H04W 4/06* (2013.01); *H04W 4/005* (2013.01)

(58) Field of Classification Search
CPC ........ H04W 4/06; H04W 84/12; H04W 88/08; H04L 2012/5608
See application file for complete search history.

(56) References Cited

U.S. PATENT DOCUMENTS 7,433,941 B1 * 10/2008 Lavian ............... H04L 41/0213
 709/201
8,594,085 B2 * 11/2013 Zuk .......................... H04L 45/04
 370/230

(Continued)

FOREIGN PATENT DOCUMENTS

JP 2010-45747 2/2010
WO WO 2012/094278 7/2012

OTHER PUBLICATIONS

International Search Report dated Apr. 15, 2014 in corresponding PCT International Application.

*Primary Examiner* — Siren Wei
(74) *Attorney, Agent, or Firm* — Finnegan, Henderson, Farabow, Garrett & Dunner, L.L.P.

(57) ABSTRACT

An object of the present invention is to provide a communication system capable of broadcasting and distributing various types of messages. The communication system according to the present invention includes a network operator device (21) disposed in a network (20) managed by a carrier; and a service platform (30) disposed between the network operator device (21) and a plurality of application servers that provide an application service. The service platform (30) transmits, to the network operator device (21), distribution data transmitted from any one of the application servers according to an event notification transmitted from a communication device (10_1), and a distribution policy used to distribute the distribution data. The network operator (Continued)

device (21) distributes the distribution data to a plurality of communication devices (10_1) to (10_3) based on the distribution policy.

19 Claims, 13 Drawing Sheets

(56) References Cited

U.S. PATENT DOCUMENTS

| | | | | |
|---|---|---|---|---|
| 2003/0008661 | A1* | 1/2003 | Joyce | H04W 4/02 455/456.1 |
| 2006/0095501 | A1* | 5/2006 | Mochida | H04L 29/06027 709/203 |
| 2009/0049093 | A1* | 2/2009 | Wassingbo | H04L 67/306 |
| 2011/0154365 | A1* | 6/2011 | Sim | G06F 9/524 719/313 |
| 2012/0108225 | A1* | 5/2012 | Luna | H04L 12/66 455/418 |
| 2012/0170451 | A1* | 7/2012 | Viswanathan | H04W 4/005 370/230 |
| 2013/0091239 | A1* | 4/2013 | Hao | H04L 29/06326 709/217 |

* cited by examiner

1

COMMUNICATION SYSTEM, SERVICE PLATFORM, COMMUNICATION METHOD, AND NON-TRANSITORY COMPUTER READABLE MEDIUM

CROSS-REFERENCE TO RELATED PATENT APPLICATIONS

This application is a National Stage Entry of International Application No. PCT/JP2014/000543, filed Feb. 3, 2014, which claims priority from Japanese Patent Application No. 2013-041045, filed Mar. 1, 2013. The entire contents of the above-referenced applications are expressly incorporated herein by reference.

TECHNICAL FIELD

The present invention relates to a communication system, a service platform, a communication method, and a program, and more specifically, to a communication system, a service platform, a communication method, and a program for, for example, broadcast distribution.

BACKGROUND ART

In the case of distributing data to a plurality of communication devices, a data distributor distributes data using a broadcast distribution service provided in a network managed by a carrier. To achieve the broadcast distribution, techniques such as a broadcast service and a multicast service are used. In mobile communication networks, CBS (Cell Broadcast Service) is used to distribute emergency information. CBS is a service that sends a notification about emergency information by broadcasting to mobile phone terminals within a target area for distribution of emergency information. Further, ETWS (Earthquake and Tsunami Warning System) is provided to meet the need for high-speed disaster notification and a flexible distribution area.

Patent Literature 1 discloses a configuration in which a distribution area is designated in a broader-area unit or a sector unit in the case of designating a distribution area for an emergency message.

CITATION LIST

Patent Literature

[Patent Literature 1] Japanese Unexamined Patent Application Publication No. 2010-45747

SUMMARY OF INVENTION

Technical Problem

Patent Literature 1 discloses a network configuration in which a message distribution station which has received a data distribution request from a flash report transmission station transmits an emergency distribution message. However, it is expected in the future that communication networks will broadcast and distribute not only messages related to emergency information, but also various types of messages. Thus, it is necessary to construct communication networks which will be able to broadcast and distribute distribution messages with different contents for each application server so that various types of messages can be broadcasted and distributed. In this regard, Patent Literature 1 discloses a network configuration capable of executing the distribution of messages requested by a specific flash report transmission station. However, Patent Literature 1 does not disclose any network configuration capable of distributing various types of messages requested by a plurality of different carriers and the like. Thus, Patent Literature 1 has a problem that it is impossible to broadcast and distribute distribution messages with different contents for each application server.

To solve the above-mentioned problem, an object of the present invention is to provide a communication system, a service platform, a communication method, and a program which are capable of broadcasting and distributing various types of messages.

Solution to Problem

A communication system according to a first exemplary aspect of the present invention includes: a network operator device disposed in a network managed by a carrier; and a service platform disposed between the network operator device and a plurality of application servers that provide an application service via the network. The service platform transmits, to the network operator device, distribution data transmitted from any one of the plurality of application servers and a distribution policy used to distribute the distribution data. The network operator device distributes, to a plurality of communication devices, the distribution data based on the distribution policy distributed from the service platform.

A service platform according to a second exemplary aspect of the present invention is disposed between a network operator device and a plurality of application servers that provide an application service via a network managed by a carrier, the network operator device being disposed in the network. The service platform includes a communication unit that transmits, to the network operator device, distribution data transmitted from any one of the plurality of application servers, and a distribution policy used to distribute the distribution data.

A communication method according to a third exemplary aspect of the present invention is a communication method used in a service platform disposed between a network operator device and a plurality of application servers that provide an application service via a network managed by a carrier, the network operator device being disposed in the network. The communication method includes: transmitting, to the network operator device, distribution data transmitted from any one of the plurality of application servers, and a distribution policy used to distribute the distribution data.

A program according to a fourth exemplary aspect of the present invention is a program for causing a computer to execute processing, the computer being disposed between a network operator device and a plurality of application servers that provide an application service via a network managed by a carrier, the network operator device being disposed in the network, the processing including the step of transmitting, to the network operator device, distribution data transmitted from any one of the plurality of application servers, and a distribution policy used to distribute the distribution data.

Advantageous Effects of Invention

According to the present invention, it is possible to provide a communication system, a service platform, a communication method, and a program which are capable of broadcasting and distributing various types of messages.

DESCRIPTION OF EMBODIMENTS

First Exemplary Embodiment

Figure 1:
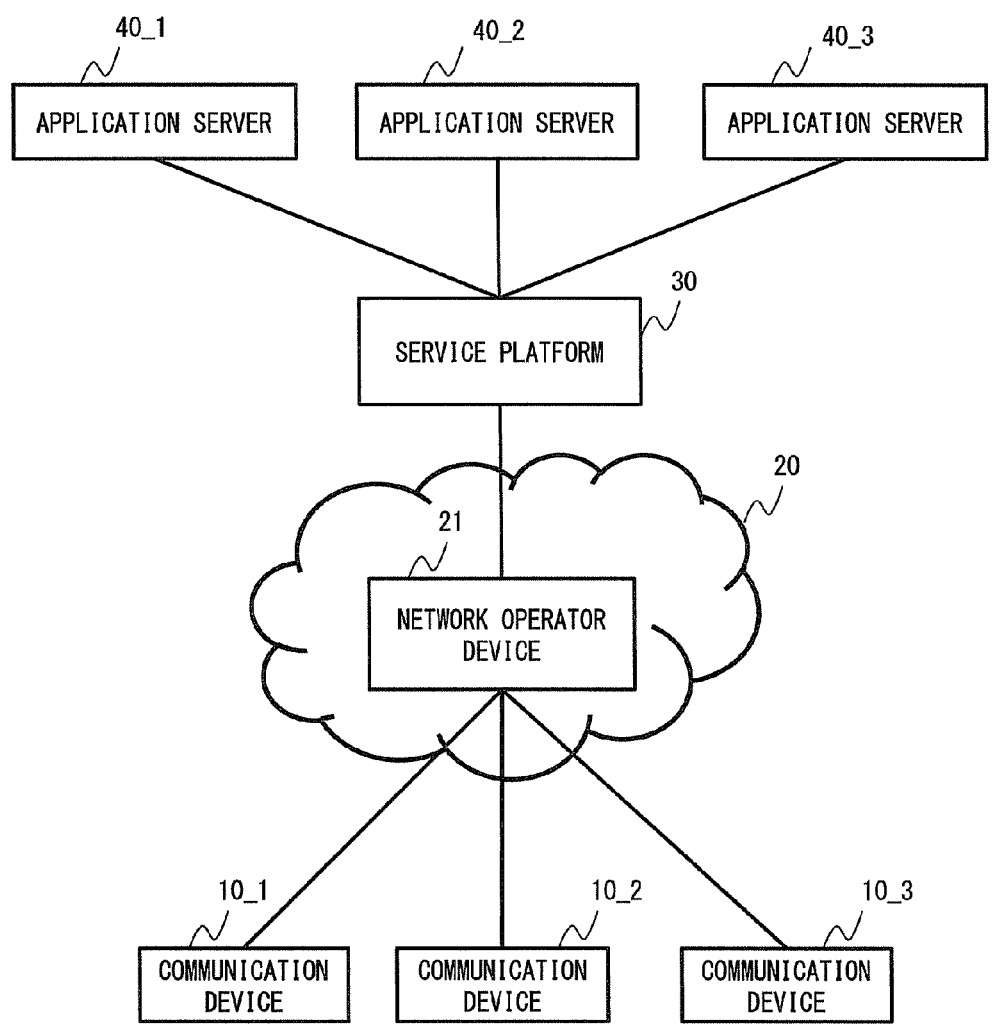
FIG. 1 is a block diagram showing a communication system according to a first exemplary embodiment.

Exemplary embodiments of the present invention will be described below with reference to the drawings. A configuration example of a communication system according to a first exemplary embodiment of the present invention will be described with reference to FIG. 1. The communication system includes communication devices 10_1 to 10_3, a network 20, a service platform 30, and application servers 40_1 to 40_3. The network 20 includes a network operator device 21.

The network operator device 21 is disposed in the network 20 which is managed by a carrier. The application servers 40_1 to 40_3 distribute messages to the communication devices 10_1 to 10_3 which are connected via the network 20.

The communication devices 10_1 to 10_3 may be, for example, mobile phone terminals, smartphone terminals, notebook personal computers, transportation means, such as automobiles or electric cars, with a communication function mounted thereon, or machines, such as clocks, which are worn by users and have a communication function mounted thereon. The communication devices 10_1 to 10_3 may also be devices having a communication function mounted thereon, such as vending machines or electrical household appliance, which are seldom moved. Alternatively, the communication devices 10_1 to 10_3 may be fixed telephones that perform communication via a fixed communication network.

The service platform 30 is disposed between the network operator device 21 and the application servers 40_1 to 40_3.

The service platform 30 transmits, to the network operator device 21, a distribution message, which was transmitted from any one of the application servers 40_1 to 40_3, and a distribution policy that is used to distribute the distribution message. In other words, the service platform 30 may receive distribution messages transmitted from the application servers 40_1 to 40_3, and may determine a distribution policy depending on the content of the received distribution messages. In another alternative, the service platform 30 may receive distribution messages and distribution policies from the application servers 40_1 to 40_3.

The network operator device 21 distributes the distribution message to the communication devices 10_1 to 10_3 based on the distribution policy transmitted from the service platform 30. For example, a distribution area, a communication device of a distribution target, a distribution period, or the like is set in the distribution policy.

As described above, in the communication system shown in FIG. 1, the service platform 30 is connected to a plurality of application servers. Further, the service platform 30 can transmit different distribution policies to the network operator device 21 depending on the content of the distribution messages provided by the application servers.

Accordingly, the network operator device 21 can distribute the distribution messages, which are requested to be distributed by various application servers, to a plurality of communication devices connected to the network 20.

FIG. 1 illustrates a configuration in which three communication devices and three application servers are provided. However, the number of communication devices and the number of application servers are not limited to three. Also in the system configurations illustrated in FIGS. 2 to 14, the number of devices is not limited to the number of devices illustrated in the figures.

Second Exemplary Embodiment

Figure 2:
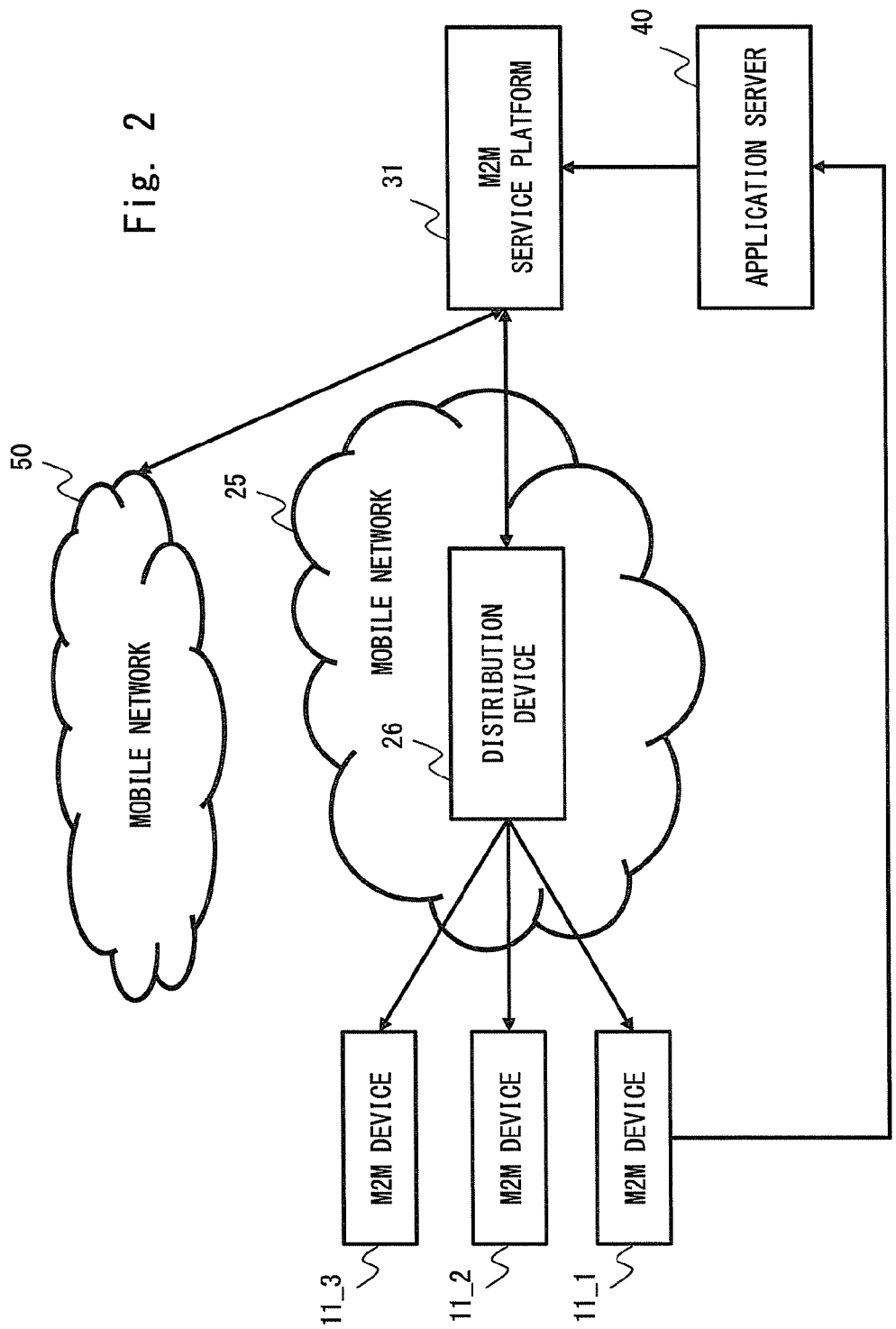
FIG. 2 is a block diagram showing a communication system according to a second exemplary embodiment.

Next, a configuration example of a communication system according to a second exemplary embodiment of the present invention will be described with reference to FIG. 2. FIG. 2 mainly illustrates M2M (Machine to Machine) communications. However, the present invention is not limited to the application of M2M communications, but can also be applied to general communications and the like. The communication system shown in this figure includes M2M devices 11_1 to 11_3, a mobile network 25, a mobile network 50, an M2M service platform (M2M service PF) PF 31, and an application server 40. The mobile network 25 includes a distribution device 26. The M2M devices 11_1 to 11_3 correspond to the communication devices shown in FIG. 1. The mobile networks 25 and 50 correspond to the network 20 shown in FIG. 1. The distribution device 26 corresponds to the network operator device 21 shown in FIG. 1. The M2M service PF 31 corresponds to the service platform 30 shown in FIG. 1.

The M2M devices 11_1 to 11_3 are, for example, devices that autonomously transmit data between the communication devices without the need for any user operation. For example, when the M2M device 11_1 is an automobile, the M2M device 11_1 notifies the application server 40 of event information generated in the automobile. The event information generated in the automobile may be, for example, information about a traffic accident. The M2M device 11_1 may acquire the information about a traffic accident from a sensor provided in the automobile. For example, the M2M device 11_1 may recognize that, for example, an airbag has been operated, based on the information output from the sensor. In this case, the M2M device 11_1 may notify the application server 40 of event information indicating that a traffic accident has occurred. Alternatively, the M2M device 11_1 may notify the application server 40 of information about what part of a vehicle has been damaged (for example, a front portion or a side portion of the vehicle) in the traffic accident, as event information, by using an acceleration sensor. In still another alternative, the M2M device 11_1 may transmit GPS information about the location of the traffic accident to the application server 40, and may also transmit information on the level of severity of the traffic accident to the application server 40.

The M2M device 11_1 may transmit the event information to the application server 40 via the mobile network 25, or may transmit the event information to the application server 40 by a communication line different from the mobile network 25. The communication line different from the mobile network 25 may, for example, be the Internet connection via a wireless LAN.

The application server 40 is a device that is managed by an application service provider. The application service provider is, for example, a company that provides an application service. The application service provider may be a carrier different from a mobile carrier. In other words, the application server 40 may be disposed in a network managed by a management policy different from that of the mobile communication network managed by the mobile carrier. The application server 40 receives the event notification transmitted from the M2M device 11 1~11 3, and estimates the location where a traffic accident has occurred and the effect of the traffic accident. Further, the application server 40 transmits, to the M2M service PF 31, the distribution message and the distribution policy according to the received event notification.

The application server 40 may provide, for example, a broadcast service that distributes information relating to the traffic accident. Specifically, the application server 40 receives, from the M2M devices 11_1 to 11_3, a message to notify that the traffic accident has occurred. In this case, the application server 40 transmits, to the M2M service PF 31, the distribution message including, for example, a message to notify the communication devices located in the area, in which the traffic accident has occurred, of the location where the traffic accident has occurred; a message to notify about the time when the traffic accident occurred; a message to notify about an alert level indicating the degree of severity and the degree of urgency of the traffic accident; a message to send a notification to vehicles at the periphery of the location where the traffic accident has occurred to slow down; a message to send a notification to vehicles at the periphery of the location where the traffic accident has occurred to urge the vehicles to change their routes; or a message to send a notification about information about a traffic jam or the like caused by the traffic accident. The distribution message may also be referred to as an alert message. The application server 40 also transmits information about the distribution policy for the broadcast service, as well as the distribution message, to the M2M service PF 31.

The distribution policy includes, for example, a distribution area, a distribution target device, or a distribution period. In this case, the application server 40 or the M2M service PF 31 may change and rewrite the content set in the distribution policy. That is, the distribution policy is information which can be changed. The distribution policy may also be referred to as a distribution parameter, distribution control information, or the like. The distribution target device is, for example, a communication device mounted on a vehicle as a distribution target of the distribution message. As the distribution target device, one of an M2M device and a non-M2M device may be selected. The distribution policy may also include, for example, information indicating whether or not to repeatedly distribute the distribution message, an interval period between a distribution of the distribution message and a repeat thereof, or a state indicating that the distribution has been stopped. The distribution policy may also be referred to as an alert parameter.

The M2M service PF 31 is connected to a plurality of networks. For example, FIG. 2 illustrates an example in which the M2M service PF 31 is connected to both the mobile network 25 and the mobile network 50. The M2M service PF 31 may be connected to a fixed communication network or the like different from the mobile network. The mobile network 25 and the mobile network 50 may be networks managed by different carriers. In another alternative, the mobile network 25 and the mobile network 50 may be networks that distribute data using different communication methods. For example, the mobile network 25 and the mobile network 50 may be networks such as 2G/3G/LTE as specified in the 3GPS, or may be a PHS network, a Wimax network, a wireless LAN, or the like.

The M2M service PF 31 is, for example, a group of devices that are managed by an M2M service provider. Accordingly, the M2M service PF 31 may be composed of a plurality of server devices or a single server device. The M2M service may be, for example, the broadcast service provided to the M2M devices.

The M2M service provider may be a carrier different from the mobile carrier and the application service provider. In other words, the M2M service PF 31 may be disposed in a network managed by a management policy different from that of networks managed by the application service provider and the mobile carrier. The M2M service provider and the application service provider may be the same carrier, and the M2M service PF 31 and the application server 40 may be disposed in a network managed based on the same management policy. Alternatively, the M2M service provider and the mobile carrier may be the same carrier, and the network operator device 21 and the distribution device 26 may be disposed in the mobile network 25 managed based on the same management policy. In still another alternative, the M2M service provider, the mobile carrier, and the application service provider may be the same carrier, and the M2M service PF 31, the application server 40, and the distribution device 26 may be disposed in a network managed based on the same management policy.

The M2M service PF 31 receives information about the distribution message and the distribution policy from the application server 40. Further, the M2M service PF 31 transmits the received information about the distribution message and the distribution policy to the distribution device 26 in the mobile network 25. While the M2M service PF 31 receives the distribution message and the distribution policy, which are transmitted from the application server 40, according to the event notification transmitted from the M2M device 11_1, the M2M service PF 31 may also receive user data which is transmitted regularly or irregularly, i.e., at an arbitrary timing, between the M2M device 11_1 and the application server 40. The M2M service PF 31 may analyze the content of the received data, and may transmit, to the distribution device 26, a distribution request message to request distribution of the distribution message based on the analysis result.

Alternatively, the M2M service PF 31 may receive the distribution message from the application server 40, and may determine the distribution policy according to the received distribution message.

In this case, the M2M service PF 31 may determine whether or not the application server 40 is an application server that is permitted to execute the broadcast service via the network connected to the M2M service PF 31. For example, the M2M service PF 31 includes a management table that manages a list of application servers that are permitted to execute the broadcast service. When the distribution message is transmitted from an application server, the M2M service PF 31 may determine whether or not the application server which has transmitted the distribution message is managed in the management table.

Alternatively, the M2M service PF 31 may determine whether or not the application server 40 is an application server that is permitted to execute the broadcast service, depending on the content of at least one of the distribution message and the distribution policy transmitted from the application server 40. For example, when the content of the distribution message indicates information about a disaster, such as earthquake information, the M2M service PF 31 may determine that the application server 40 can execute the broadcast service. When the content of the distribution message indicates information other than the information about a disaster, the M2M service PF 31 may determine that the application server 40 cannot execute the broadcast service. Further, when the distribution policy includes a specific area as the distribution area defined in the distribution policy, the M2M service PF 31 determines that the application server 40 can execute the broadcast service, while when the distribution policy does not include any specific area as the distribution area, the M2M service PF 31 may determine that the application server 40 cannot execute the broadcast service.

The M2M service PF 31 selects a network for transmitting the distribution message from among the plurality of connected networks. In other words, the M2M service PF 31 selects a network for distributing the distribution message to the M2M devices. The M2M service PF 31 may select a network based on the distribution policy transmitted from the application server 40. That is, the M2M service PF 31 selects a network that can satisfy the distribution policy transmitted from the application server 40. For example, the M2M service PF 31 may select a network that can distribute the distribution message to the distribution area set in the distribution policy. The M2M service PF 31 may also select a network that can distribute data to the distribution target device set in the distribution policy.

The M2M service PF 31 may include information about a congestion state of each network, and may select a network with a small amount of communication traffic. FIG. 2 illustrates that the M2M service PF 31 selects the mobile network 25.

The M2M service PF 31 may also select a network for distribution depending on the content of the distribution message transmitted from the application server 40. That is, the M2M service PF 31 may select a network for distribution based on the distribution policy transmitted from the application server 40, or may select a network for distribution depending on the content of the distribution message transmitted from the application server 40.

The M2M service PF 31 may also select a network for distribution according to the distribution message and the distribution policy transmitted from the application server 40.

The M2M service PF 31 transmits the distribution message to the selected network, and also transmits the distribution policy to the distribution device 26. In this case, the M2M service PF 31 may change the message format, coding system, or the like of the distribution message and the distribution policy depending on the selected network.

In this case, the M2M service PF 31 may perform charging according to the distribution policy transmitted from the application server 40. For example, when a wide distribution area is designated in the distribution policy transmitted from the application server 40, the M2M service PF 31 may charge the application server 40 a rate higher than that when a narrow distribution area is designated in the distribution policy.

The distribution device 26 distributes the distribution message to the M2M devices 11_1 to 11_3 based on the distribution policy transmitted from the M2M service PF 31. When a distribution area is set in the distribution policy, the distribution device 26 distributes the distribution message to the M2M devices 11_1 to 11_3 via a base station or the like disposed in the set distribution area. When a distribution target device is set in the distribution policy, the distribution device 26 distributes the distribution message to the M2M devices 11_1 to 11_3 via a base station or the like that communicates with the distribution target device. The distribution policy received by the distribution device 26 from the M2M service PF 31 may be referred to as a broadcast parameter so as to distinguish the distribution policy from the alert parameter which is transmitted to the M2M service PF 31 from the application server.

The distribution device 26 may distribute the distribution message by broadcast distribution such as broadcast communication, multicast communication, or cell broadcast communication. As the multicast communication, for example, MBMS (Multimedia Broadcast Multicast Service) may be used. As the cell broadcast communication, for example, ETWS (Earthquake and Tsunami Warning System) may be used.

After completion of the distribution of the distribution message, the distribution device 26 may transmit a completion notification message to the M2M service PF 31. Further, the M2M service PF 31 may summarize and transmit completion notification messages to the application server 40.

The configuration in which the application server 40 transmits the distribution message and the distribution policy to the M2M service PF 31 based on the event notification transmitted from the M2M devices has been described above. However, the operation of the application server 40 is not limited to this. For example, the application server 40 may receive an event notification about a traffic accident from an information server or the like which summarizes information about the traffic accident. Alternatively, the application server 40 may periodically distribute information about traffic information to the M2M service PF 31.

When the function for periodically performing a broadcast is not used in the network, for example, the M2M service PF 31 may repeatedly transmit a distribution message and a distribution policy to the network. This enables the network to execute the broadcast every time the network receives a distribution message and a distribution policy.

Figure 3:
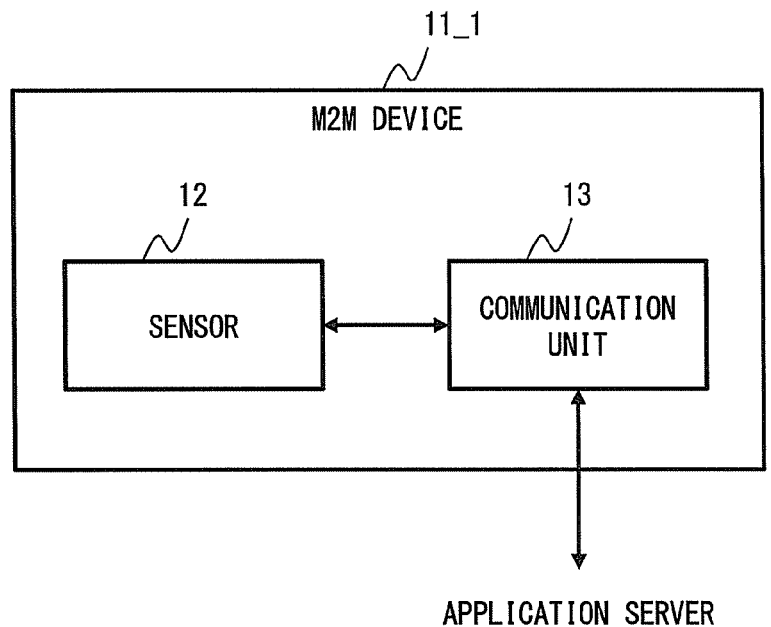
FIG. 3 is a block diagram showing an M2M device according to the second exemplary embodiment.

Next, a configuration example of the M2M device 11_1 will be described with reference to FIG. 3. Note that the M2M devices 11_2 and 11_3 have the same configuration as that of the M2M device 11_1, and thus the detailed description thereof is omitted. The M2M device 11_1 includes a sensor 12 and a communication unit 13. If the M2M device 11_1 is a vehicle, such as a general vehicle, a truck, or a taxi, for example, the sensor 12 detects an operation related to a traffic accident, such as the operation of an airbag as mentioned above. Further, the sensor 12 may collect GPS data indicating the present location of the M2M device 11_1. The sensor 12 outputs the detected or collected information to the communication unit 13.

This figure discloses the configuration in which the M2M device 11_1 includes the sensor 12. However, the sensor 12 may be provided outside of the M2M device 11_1.

The M2M device 11_1 transmits the information output from the sensor 12 to the application server 40 as an event notification. The communication unit 13 may transmit the event notification to the application server 40 via a wireless line provided by a mobile carrier, or may transmit the event notification to the application server 40 via a wireless LAN (Local Area Network), the Internet, or the like.

Figure 4:
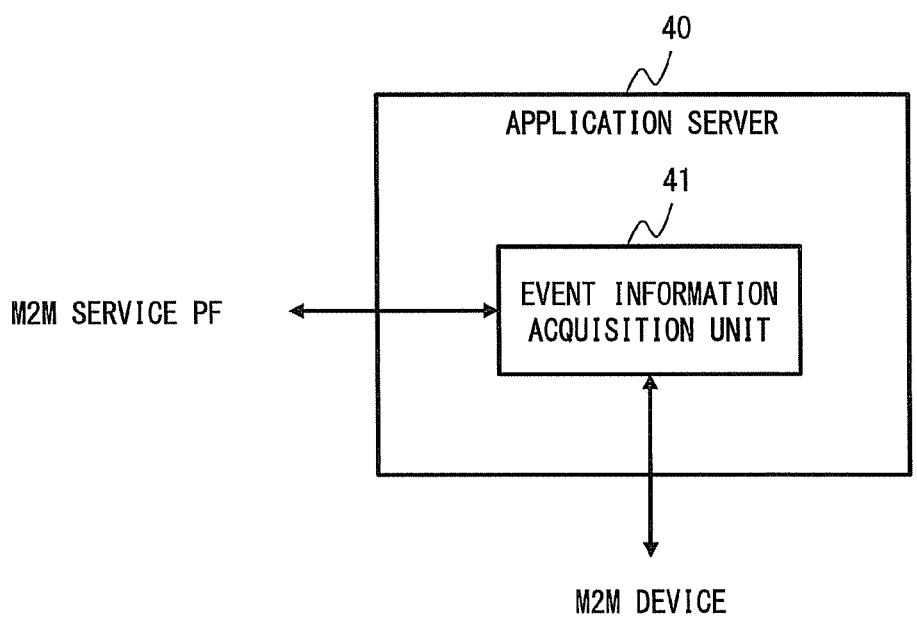
FIG. 4 is a block diagram showing an application server according to the second exemplary embodiment.

Next, a configuration example of the application server 40 will be described with reference to FIG. 4. The application server 40 includes an event information acquisition unit 41. The event information acquisition unit 41 receives the event notification from the M2M devices 11_1 to 11_3. Further, the event information acquisition unit 41 transmits the distribution message corresponding to the received event notification to the M2M service PF 31. Furthermore, the event information acquisition unit 41 transmits the distribution policy as well as the distribution message to the M2M service PF 31.

Figure 5:
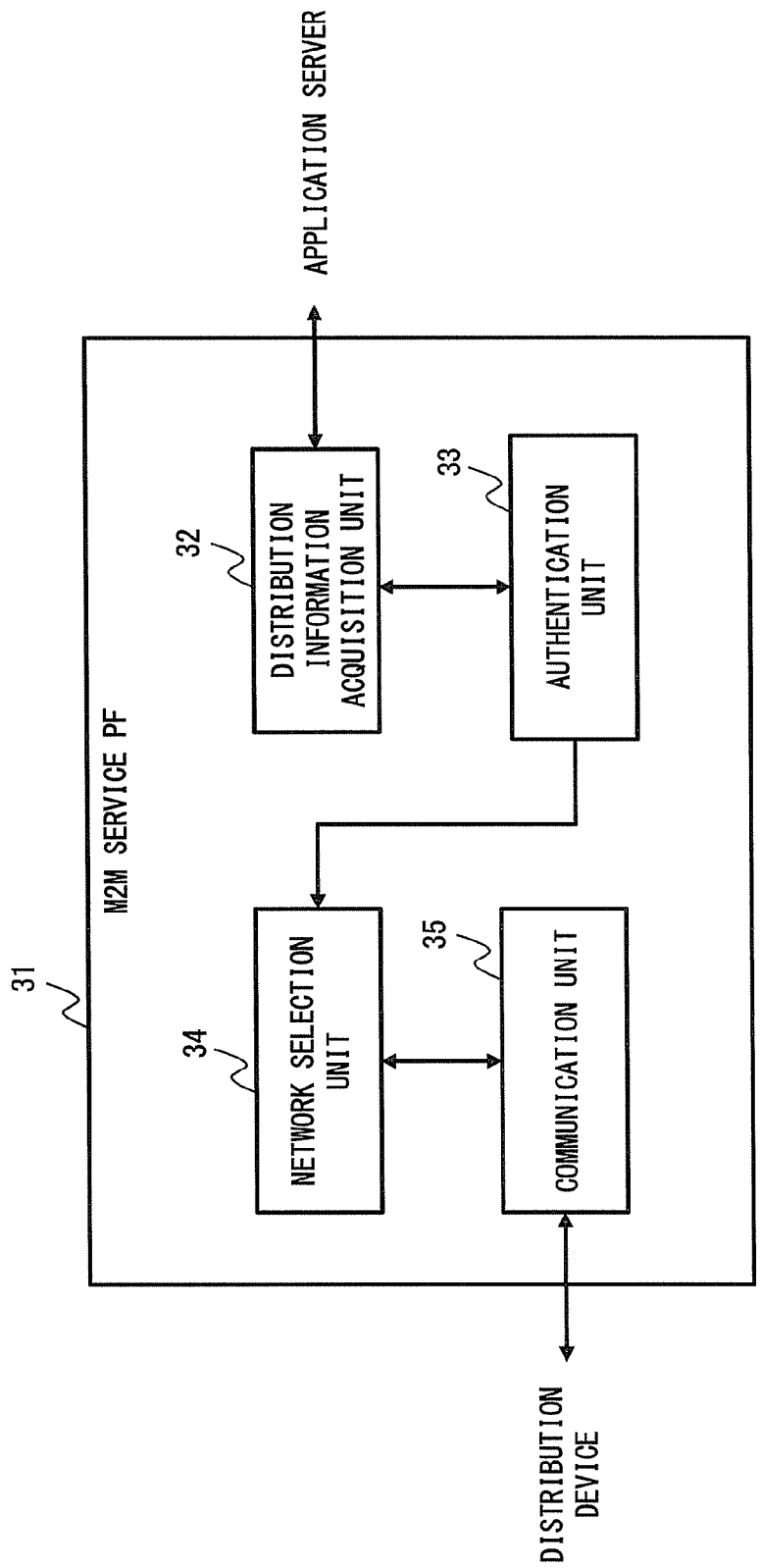
FIG. 5 is a diagram showing an M2M service platform according to the second exemplary embodiment.

Next, a configuration example of the M2M service PF 31 will be described with reference to FIG. 5. The M2M service PF 31 includes a distribution information acquisition unit 32, an authentication unit 33, a network selection unit 34, and a communication unit 35.

The distribution information acquisition unit 32 receives the information about the distribution message and distribution policy from the application server 40. The authentication unit 33 determines whether or not the application server 40 which has transmitted the distribution message is an application server that is permitted to perform the broadcast service. The authentication unit 33 may perform authentication using a database that manages a list of application servers permitted to perform the broadcast service. After the authentication as to whether or not the application server 40 is an application server that is permitted to perform the broadcast service is performed once, the authentication unit 33 need not necessarily perform the authentication for the distribution message transmitted from the same source.

The network selection unit 34 selects, from among the plurality of networks, a network for distributing the distribution message transmitted from the application server 40. As described above, the network selection unit 34 may select a network for distribution by using the distribution policy received from the application server 40.

The network selection unit 34 outputs the distribution message and the distribution policy to the communication unit 35 that performs communication with the selected network.

The communication unit 35 transmits the distribution message and the distribution policy to the distribution device 26 in the selected mobile network 25.

Figure 6:
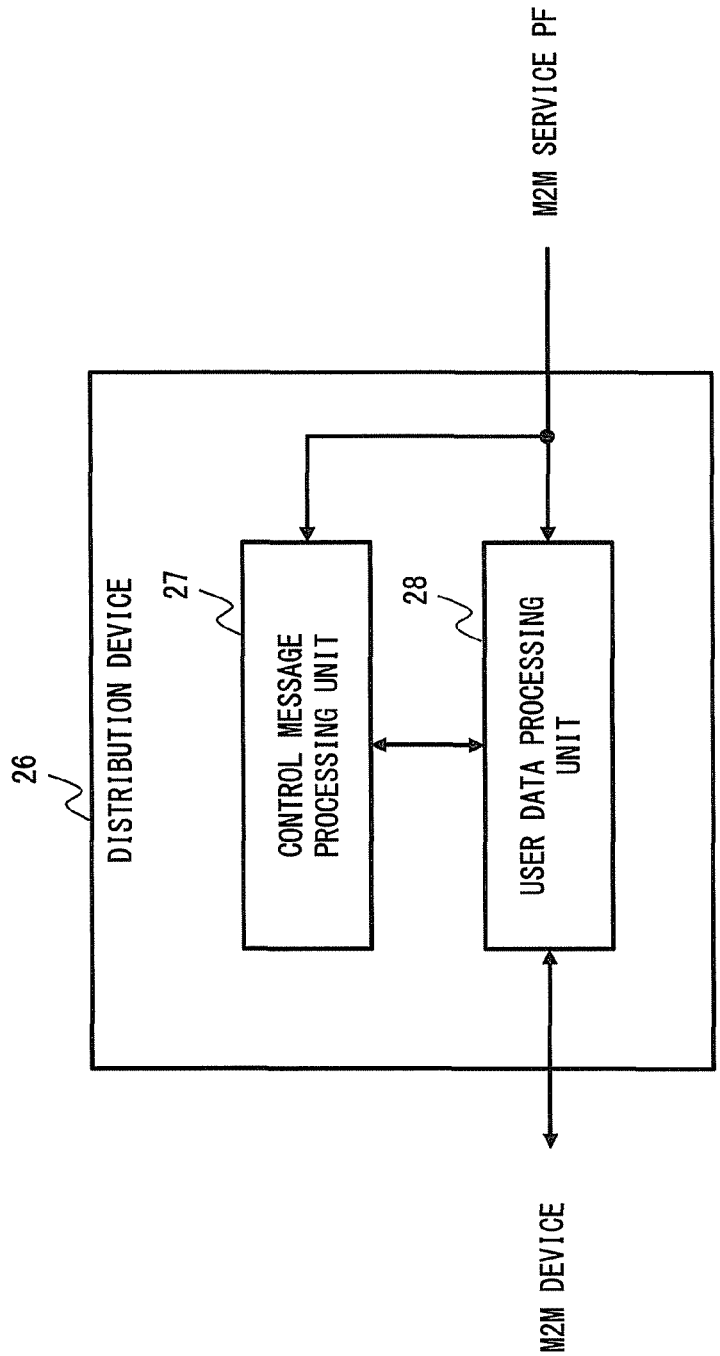
FIG. 6 is a block diagram showing a distribution device according to the second exemplary embodiment.

Next, a configuration example of the distribution device 26 will be described with reference to FIG. 6. The distribution device 26 includes a control message processing unit 27 and a user data processing unit 28.

The control message processing unit 27 receives the distribution policy transmitted from the M2M service PF 31. The control message processing unit 27 determines a distribution destination base station, a relay device, or the like based on, for example, the distribution policy, thereby determining a communication path for the distribution message. The control message processing unit 27 outputs information about the determined communication path to the user data processing unit 28.

The user data processing unit 28 distributes the distribution message received from the M2M service PF 31 to the M2M devices 11_1 to 11_3 via the base station or the like, which communicates with the M2M devices 11_1 to 11_3, based on the information about the communication path output from the control message processing unit 27.

Figure 7:
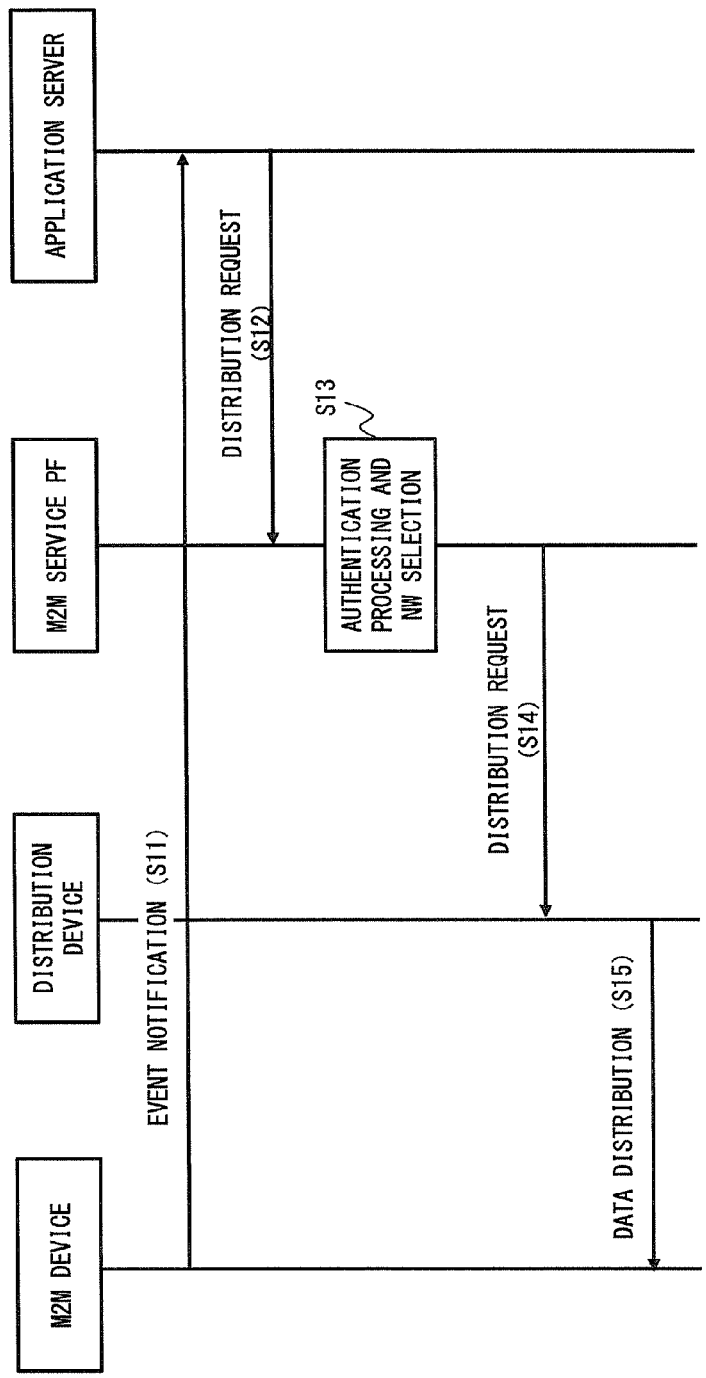
FIG. 7 is a diagram showing a distribution processing flow according to the second exemplary embodiment.

Next, a distribution processing flow according to the second exemplary embodiment of the present invention will be described with reference to FIG. 7. First, the M2M device 11_1 transmits the event notification to the application server 40 (S11) for notifying it, for example, about the occurrence of a traffic accident. For example, the M2M device 11_1 transmits, to the application server 40, a location where the traffic accident has occurred, or a traffic accident severity level. The traffic accident severity level may indicate, for example, the extent of damage. Next, the application server 40 transmits the distribution request message including the distribution message and the distribution policy to the M2M service PF 31 (S12).

Next, the M2M service PF 31 performs authentication processing as to whether or not the application server 40 which has transmitted the distribution request message is an application server that is permitted to execute the broadcast service. Further, the M2M service PF 31 selects, from among the plurality of networks, a network for transmitting the distribution request message (S13).

Next, the M2M service PF 31 transmits the distribution request message to the distribution device 26 disposed in the selected network 25 (S14). The distribution device 26 distributes the distribution message, which is included in the distribution request message, to the M2M devices 11_1 to 11_3 based on the distribution policy included in the distribution request message transmitted from the M2M service PF 31 (S15). The distribution device 26 distributes the distribution message according to, for example, the distribution area, the distribution device, the distribution period, or the like designated in the distribution policy.

Figure 8:
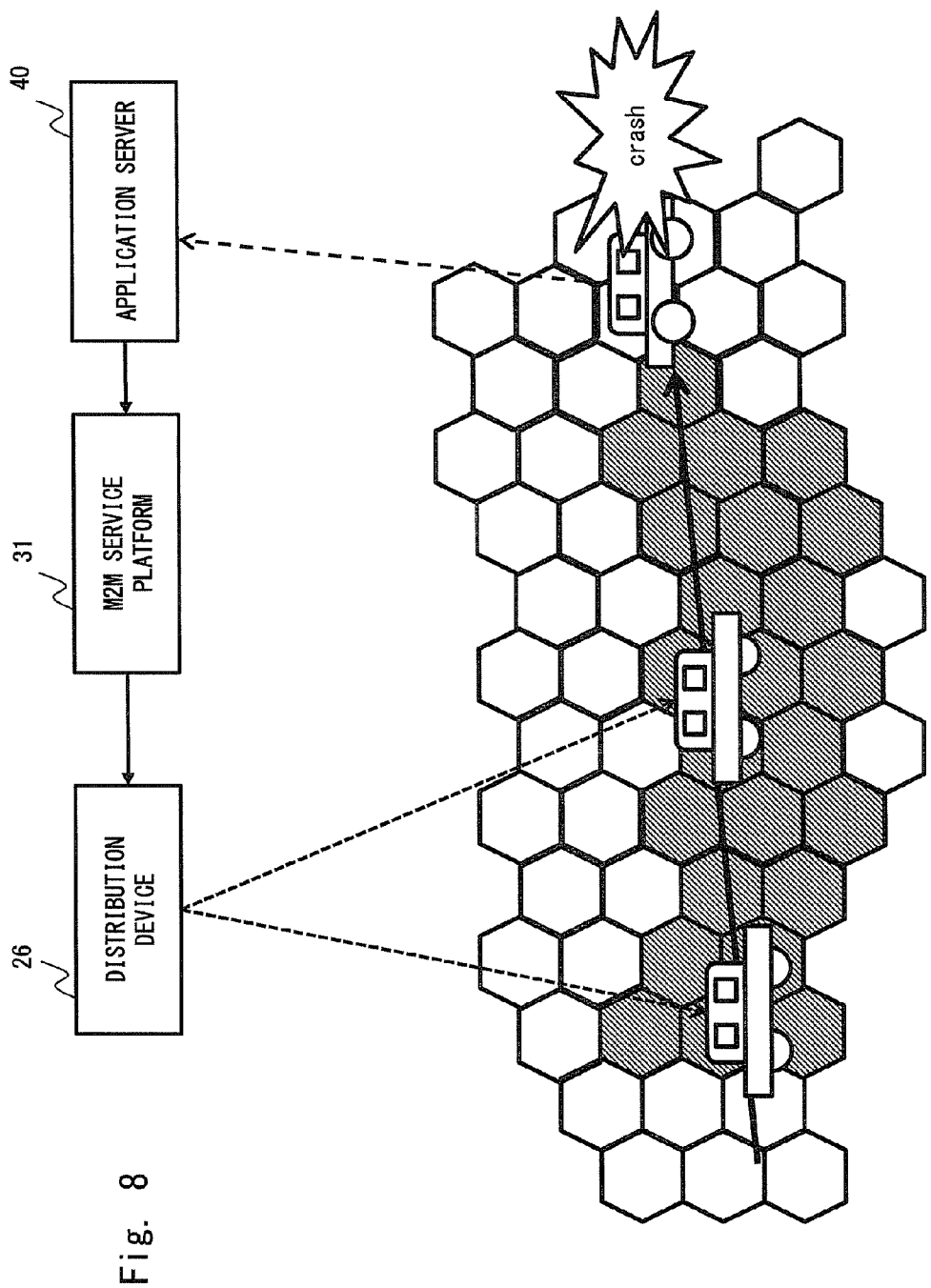
FIG. 8 is a diagram for explaining an outline of services according to the second exemplary embodiment.

Next, an outline of the broadcast service according to the second exemplary embodiment of the present invention will be described with reference to FIG. 8. FIG. 8 illustrates a state in which a vehicle travels from the left to the right. Each hexagonal area represents an area covered by one base station, and indicates, for example, a cell or a sector.

The lower part of FIG. 8 illustrates a state in which a vehicle on the right side among the three vehicles has caused a traffic accident. In such a case, the vehicle involved in the occurrence of the traffic accident sends a notification about the occurrence of the traffic accident to the application server 40 as event information. In this case, the application server transmits, to the distribution device 26, the distribution policy to send a notification about the occurrence of the traffic accident to vehicles located at a distance of N (N is a given value equal to or more than 0) km from the point where the traffic accident has occurred and the distribution message to notify about the occurrence of the traffic accident, via the M2M service PF 31.

The distribution device 26 which has received the distribution message and distribution policy determines the distribution area within the mobile network 25. Shaded areas in FIG. 8 represent the distribution area determined by the distribution device 26. The distribution device 26 distributes the distribution message to vehicles traveling in the distribution area. The number of vehicles to which the distribution message is distributed is only an example. Vehicles located in the shaded areas can be distribution target vehicles to which the distribution message is distributed.

FIG. 8 illustrates an example in which information is distributed when a traffic accident occurs. Meanwhile, if the occurrence of a traffic jam is detected, or if it is detected that a traffic jam is likely to occur, based on information transmitted from a plurality of vehicles, traffic jam information and route guidance information may be distributed to vehicles which are likely to be involved in the traffic jam.

Further, if information about traveling of an emergency vehicle, such as an ambulance, a police vehicle, or a fire-fighting vehicle, is detected, the information about traveling of the emergency vehicle may be distributed to vehicles traveling to the destination of the emergency vehicle.

As described above, in the communication system according to the second exemplary embodiment of the present invention, a plurality of application servers are connected to the M2M service PF 31. This configuration enables the distribution device 26 in the mobile network 25 to distribute various types of distribution messages to the plurality of communication devices including the M2M devices.

Furthermore, the M2M service PF 31 is connected to a plurality of networks including mobile networks. This configuration enables the M2M service PF 31 to select and distribute a distribution message to an optimum network according to the distribution policy transmitted from the application server 40.

Third Exemplary Embodiment

Figure 9:
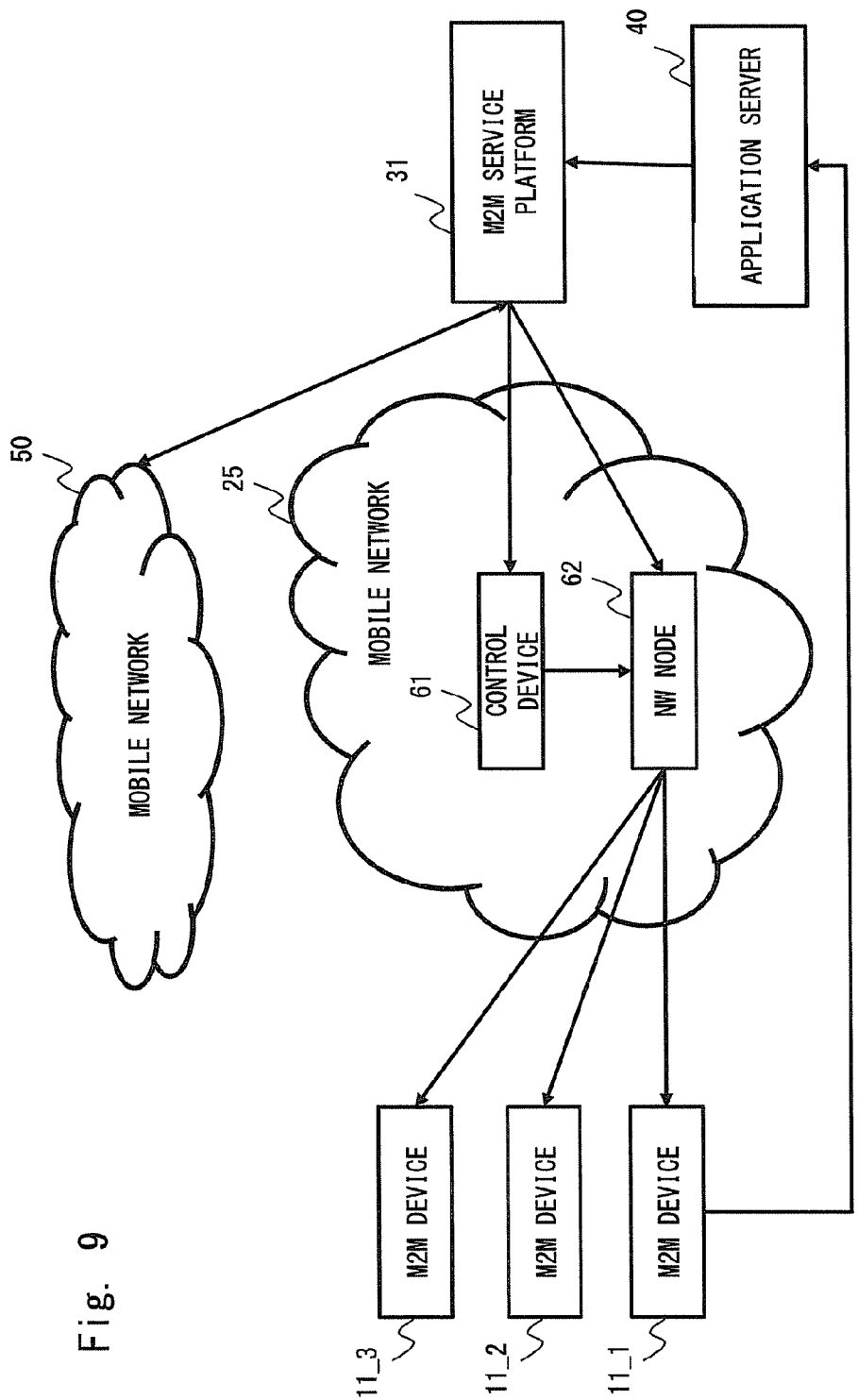
FIG. 9 is a block diagram showing a communication system according to a third exemplary embodiment.

Next, a configuration example of a communication system according to a third exemplary embodiment of the present invention will be described with reference to FIG. 9. The communication system shown in this figure differs from the communication system shown in FIG. 2 in that the distribution device 26 of the communication system shown in FIG. 2 is replaced by a control device 61 and an NW node 62.

The control device 61 relays a control message between the M2M service PF 31 and the NW node 62. The control message may be, for example, the distribution policy transmitted from the M2M service PF 31. For example, the control device 61 determines the distribution area for the distribution message based on the distribution policy, and outputs information about the determined distribution area to the NW node 62. The control device 61 may also output information about a distribution timing, a distribution period, or the like to the NW node 62. The control message may be a message used to control values of parameters set for the M2M devices 11_1 to 11_3 to perform communication via the mobile network 25.

The NW node 62 distributes the distribution message received from the M2M service PF 31 to the M2M devices 11_1 to 11_3. The NW node 62 receives the information about the distribution area from the control device 61, and distributes the distribution message to the M2M device located in the received distribution area. Further, the NW node 62 may distribute the distribution message at the distribution timing instructed by the control device 61.

In this case, the control device 61 may include the control message processing unit 27, which is described above with reference to FIG. 6, and may execute the processing using the control message. Further, the NW node 62 may use the user data processing unit 28, which is described above with reference to FIG. 6, and may execute the processing using the distribution message as user data.

As described above, the use of the communication system according to the third exemplary embodiment of the present invention makes it possible to process the control message and the user data in different devices within the mobile network 25. Accordingly, the processing load of the control device 61 and the NW node 62 can be reduced as compared with a case where the control message and the user data are processed in one device.

Fourth Exemplary Embodiment

Figure 10:
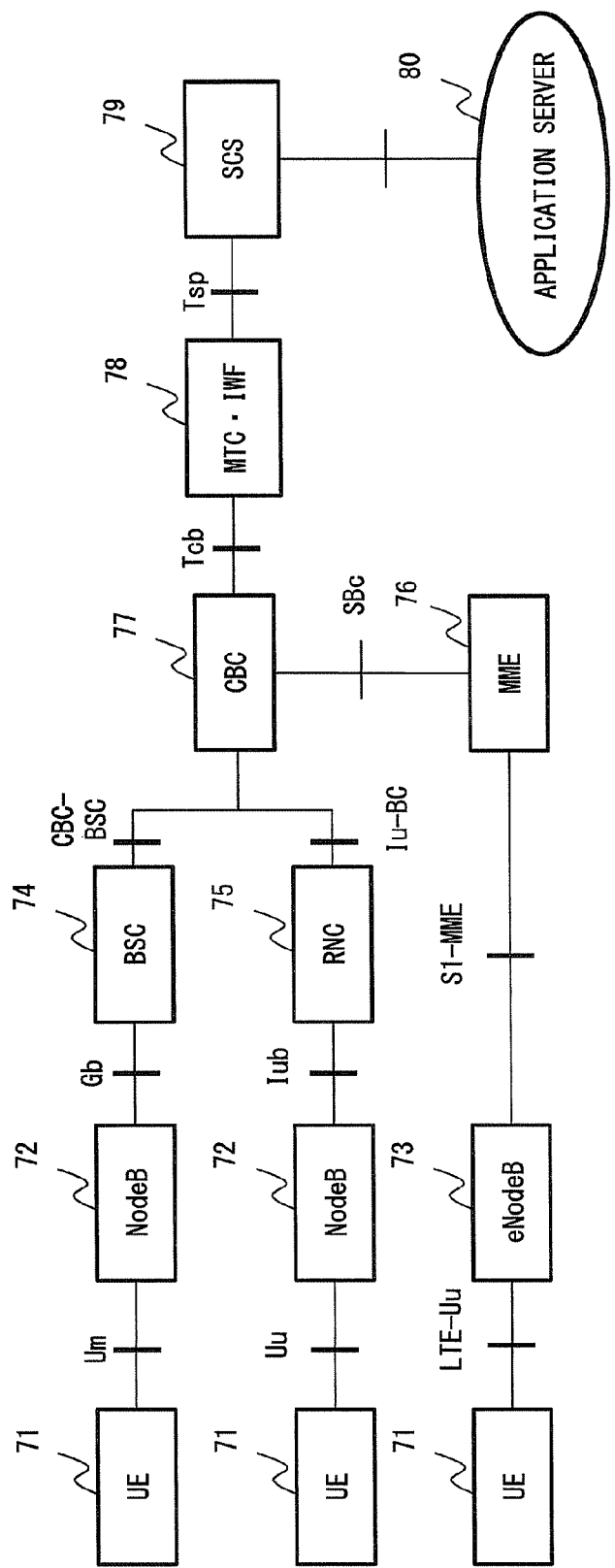
FIG. 10 is a block diagram showing a communication system according to a fourth exemplary embodiment.

Next, a configuration example of a mobile network according to a fourth exemplary embodiment of the present invention will be described with reference to FIG. 10. FIG. 10 illustrates an example in which a mobile network specified in 3GPP (3rd Generation Partnership Project) is used by a mobile carrier. The mobile network shown in this figure includes a UE (User Equipment) 71, a NodeB 72, an eNodeB 73, a BSC (Base Station Controller) 74, an RNC (Radio Network Controller) 75, an MME (Mobility Management Entity) 76, a CBC (Cell Broadcast Center) 77, an MTC-IWF (Interworking Function) 78, an SCS (Service Capability Server) 79, and an application server 80.

The SCS 74 corresponds to the M2M service platform PF. The MTC-IWF 78 corresponds to the distribution device 26 or the control device 61. Node devices other than the UE 71 correspond to the distribution device 26 or the NW node 62.

The UE 71 is a mobile communication device. The NodeB 72 and the eNodeB 73 are base station devices. More particularly, the eNodeB 73 is a base station device used in the LTE. The MME 76 mainly performs mobility management of the UE 71. The BSC 74 and the RNC 75 are devices that control the NodeB 72. The CBC 77 is a device used to execute the cell broadcast. The SCS 79 is a communication node which is provided to communicate with the application server 80 and acquires information about the distribution message and the distribution policy from the application server 80. The SCS 79 outputs the distribution policy to the MTC-IWF 78 as a control message.

The MTC-IWF 78 specifies the distribution area for the distribution message based on the distribution policy transmitted from the SCS 79.

The symbols "Um", "Uu", "LTE-Uu", "Gb", "Iub", "CBC-BSC", "Iu-BC", "S1-MME", "SBc", "Tcb", and "Tsp" in this figure represent the names of interfaces between devices.

As described above, the use of the mobile network according to the fourth exemplary embodiment of the present invention makes it possible to distribute the distribution message to a desired area of the application server based on the information about the distribution policy transmitted from the SCS 79, even when the network specified in the 3GPP is used.

Fifth Exemplary Embodiment

Figure 11:
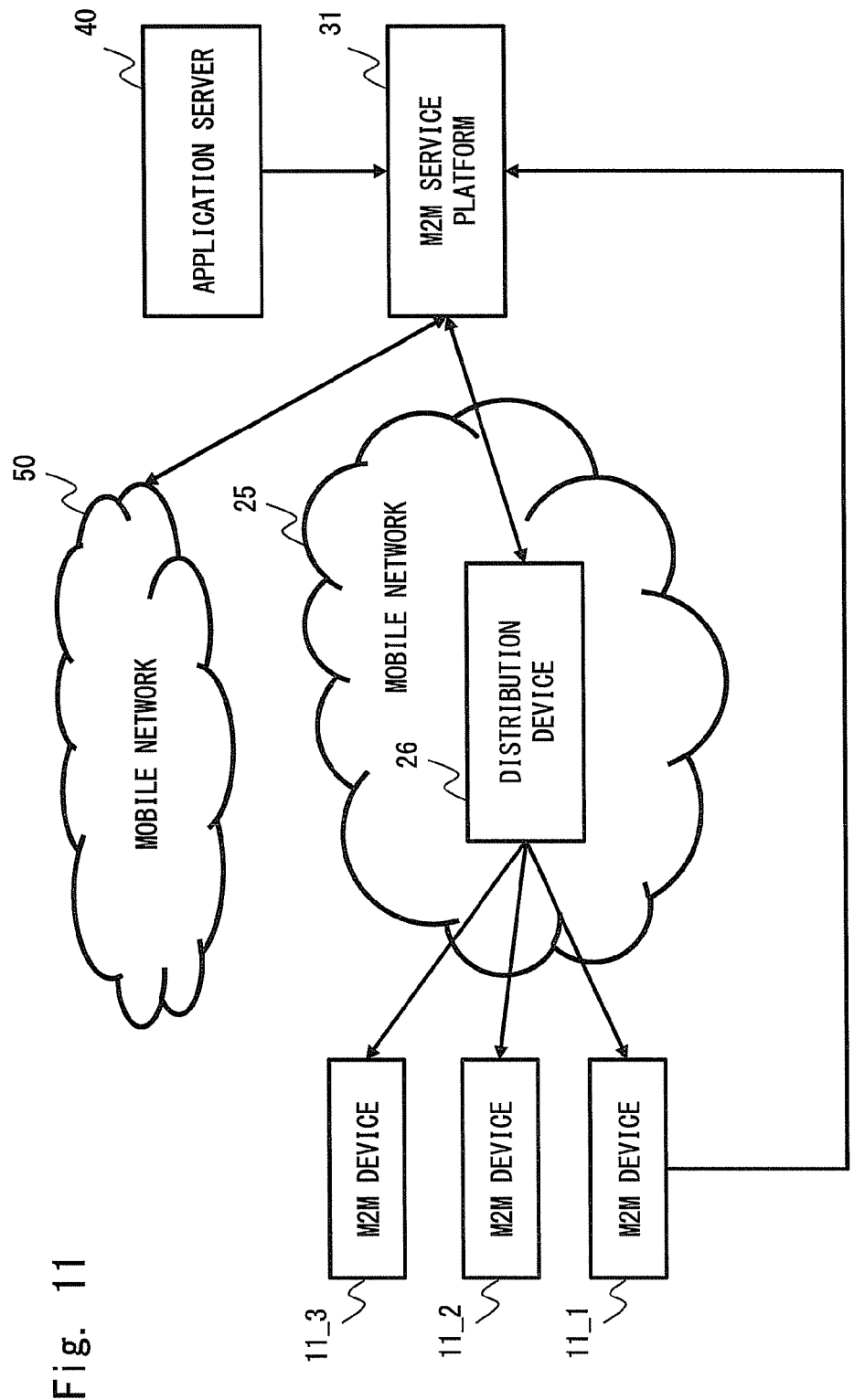
FIG. 11 is a block diagram showing a communication system according to a fifth exemplary embodiment.

Next, a configuration example of a communication system according to a fifth exemplary embodiment of the present invention will be described with reference to FIG. 11. The communication system shown in this figure differs from the communication system shown in FIG. 2 in that the destination of the event notification transmitted by the M2M device 11_1 is the M2M service PF 31, not the application server 40.

In the case of the communication system configured as shown in this figure, the M2M service PF 31 may receive the distribution message and distribution conditions in advance from the application server 40, and may temporarily store the received information in a memory or the like. At a timing when an event notification is received from the M2M device 11_1, the M2M service PF 31 may determine the distribution policy using the distribution conditions, which are received and stored in advance, and may transmit the distribution message and the distribution policy to the distribution device 26. The term "distribution conditions" herein used refers to predetermined conditions used to determine the distribution policy when an event notification is transmitted from the M2M device 11_1. For example, when an event notification is transmitted from the M2M device 11_1, the M2M service PF 31 may determine to transmit the distribution message preliminarily stored in the plurality of M2M devices, based on the distribution conditions. Further, when the M2M service PF 31 determines to transmit the distribution message, the M2M service PF 31 may determine the distribution policy to designate the distribution area or the like.

The M2M service PF 31 receives the distribution message and the distribution policy in advance and executes authentication processing and network selection processing, thereby making it possible to transmit the distribution message to the distribution device 26 immediately after receiving the event notification. Therefore, unlike in a case where the distribution message is transmitted to the M2M service PF 31 from the application server after the event notification is transmitted from the M2M device to the application server, the authentication processing and the like are completed in advance, so that the distribution message can be rapidly distributed to the M2M devices.

Sixth Exemplary Embodiment

Figure 12:
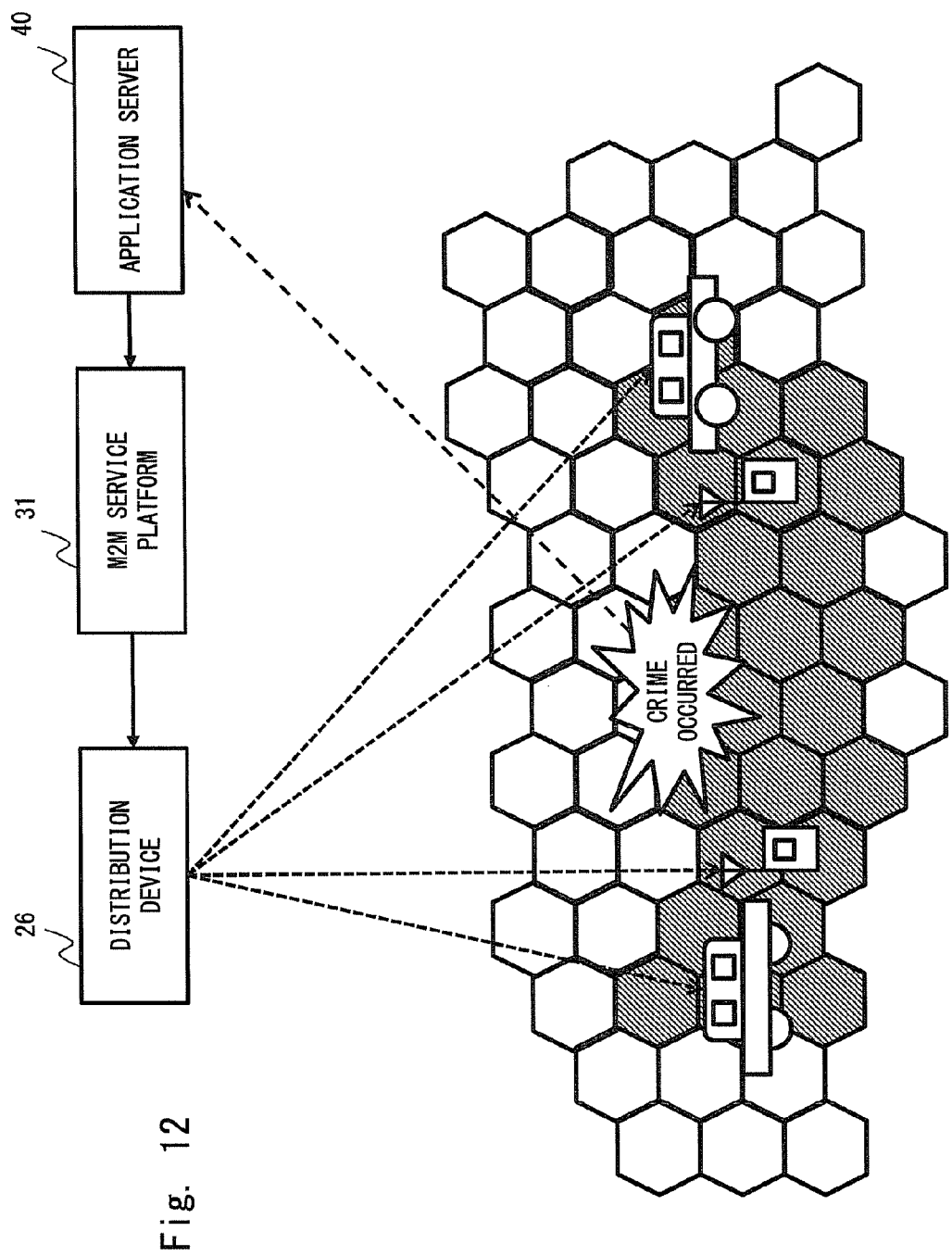
FIG. 12 is a diagram for explaining an application service according to a sixth exemplary embodiment.

Next, examples of the application servers and M2M devices which are different from those of the second exemplary embodiment will be described. In the second exemplary embodiment, each application server is described as being a server managed by a company that provides a broadcast service of distributing information relating to a traffic accident. In addition to this, as shown in FIG. 12, the application server may be a server managed by a company that provides a service of sending a notification about crime occurrence information to communication devices owned by users located in the vicinity of an area where a crime has occurred. For example, when the occurrence of a crime is detected, the application server 40 may transmit, to the M2M service PF 31, the distribution policy that the crime occurrence information is transmitted to communication devices owned by children located in the vicinity of the area where the crime has occurred, and also to communication devices owned by their parents. In order to achieve such a service, the M2M devices may work in cooperation with a device, such as a security buzzer, and when the security buzzer is used, the M2M devices may transmit information about the occurrence of the crime to the application server as event information.

The case where a crime has occurred as shown in FIG. 12 can be replaced by a case where a fire has occurred. When the occurrence of a fire is detected, the application server 40 may predict an area damaged due to the occurrence of the fire, and may send a notification about fire occurrence information to communication devices located in the damaged area. For example, a message indicating an evacuation advisory may be distributed to mobile phone terminals and the like, and a message indicating that it is prohibited to approach the fire scene may be distributed to communication devices mounted on vehicles.

Figure 13:
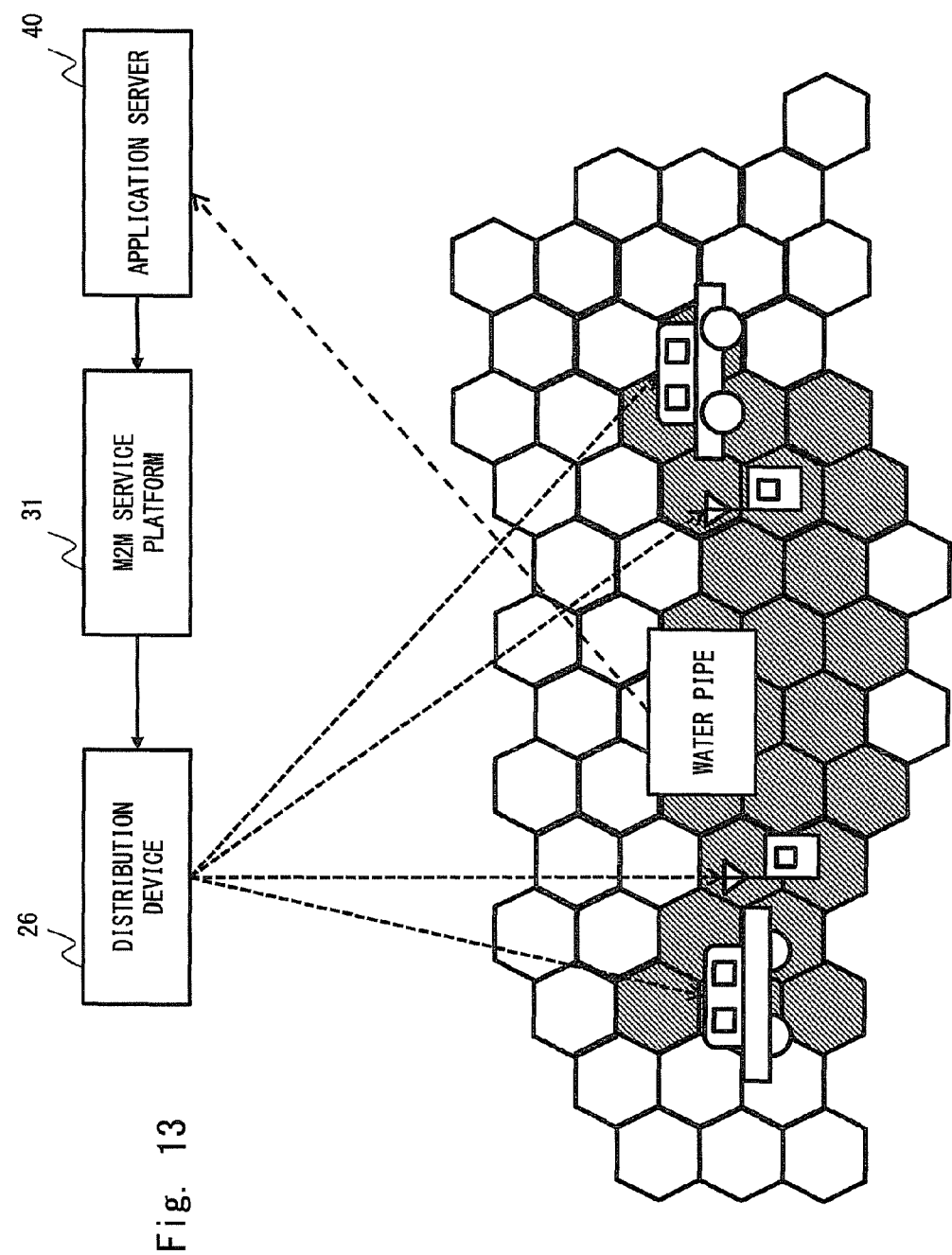
FIG. 13 is a diagram for explaining an application service according to the sixth exemplary embodiment.

The application server may also be a server managed by a company that manages water. For example, as shown in FIG. 13, when the application server 40 is notified of a water pipe rupture from a leakage sensor of a water pipe, the application server 40 may distribute information about the occurrence of water leakage to communication devices located in the vicinity of the ruptured water pipe, and may also distribute a message to instruct the communication devices to control a water valve. Further, the application server may also distribute information about the extent of damage due to the water leakage.

Figure 14:
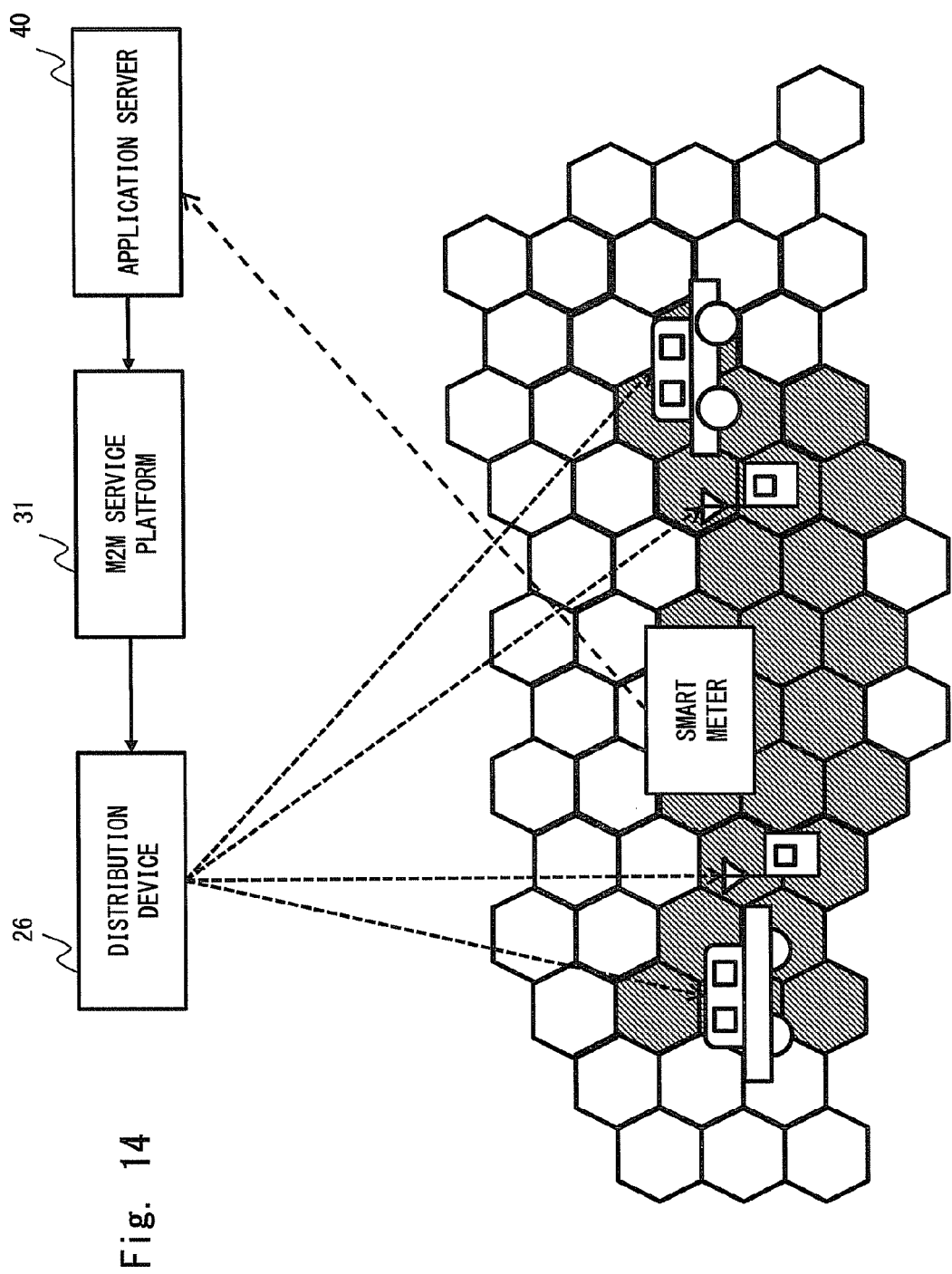
FIG. 14 is a diagram for explaining an application service according to the sixth exemplary embodiment.

The application server may also be a server managed by a company that performs a smart grid control. For example, as shown in FIG. 14, when a rapid change in voltage of a specific smart meter is detected, the application server 40 may distribute a message about voltage suppression to communication devices located in the vicinity of the smart meter.

As described above, the use of the communication systems described in the first to fourth exemplary embodiments makes it possible to distribute information according to various services. At this time, the M2M service PF 31 is connected to a plurality of application servers and is disposed between the network and the application servers, which eliminates the need for the network to support a connection, for example, each time a new application server is added. Furthermore, since the M2M service PF 31 also executes the authentication processing, setting changes on the network side are minimized and information can be distributed according to various services.

Although the present invention is described as a hardware configuration in the above exemplary embodiments, the present invention is not limited to this. According to the present invention, the processing of the service platform can be implemented by causing a CPU (Central Processing Unit) to execute a computer program.

In the above-mentioned examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media.

Examples of transitory computer readable media include electric signals, optical signals, and electromagnetic waves. Transitory computer readable media can provide the program to a computer via a wired communication line, such as electric wires and optical fibers, or a wireless communication line.

Note that the present invention is not limited to the above exemplary embodiments, and can be modified as appropriate without departing from the scope of the invention.

While the present invention has been described above with reference to exemplary embodiments, the present invention is not limited to the above exemplary embodiments. The configuration and details of the present invention can be modified in various ways which can be understood by those skilled in the art within the scope of the invention.

This application is based upon and claims the benefit of priority from Japanese patent application No. 2013-41045, filed on Mar. 1, 2013, the disclosure of which is incorporated herein in its entirety by reference.

REFERENCE SIGNS LIST

10_1 COMMUNICATION DEVICE
10_2 COMMUNICATION DEVICE
10_3 COMMUNICATION DEVICE
11_1 M2M DEVICE
11_2 M2M DEVICE
11_3 M2M DEVICE
12 SENSOR
13 COMMUNICATION UNIT
20 NETWORK
21 NETWORK OPERATOR DEVICE
25 MOBILE NETWORK
26 DISTRIBUTION DEVICE
27 CONTROL MESSAGE PROCESSING UNIT
28 USER DATA PROCESSING UNIT
30 SERVICE PLATFORM
31 M2M SERVICE PF
32 DISTRIBUTION INFORMATION ACQUISITION UNIT
33 AUTHENTICATION UNIT
34 NETWORK SELECTION UNIT
35 COMMUNICATION UNIT
40 APPLICATION SERVER
40_1 APPLICATION SERVER
40_2 APPLICATION SERVER
40_3 APPLICATION SERVER
41 EVENT INFORMATION ACQUISITION UNIT
50 MOBILE NETWORK
61 CONTROL DEVICE
62 NW NODE
71 UE
72 NodeB
73 eNodeB
74 BSC
75 RNC
76 MME
77 CBC
78 MTC IWF
79 SCS
80 APPLICATION SERVER

The invention claimed is:

1. A communication system comprising:
a network operator device;
an application server that provides an application service via the network; and
a service platform disposed between the network operator device and the application server, wherein
the application server is configured to receive an event notification transmitted from one of a plurality of communication devices, and determines distribution data and a distribution policy based on the event notification, the distribution policy being used to distribute the distribution data,
the service platform is configured to:
receive, from the application server, a distribution request message including the distribution data and the distributed policy,
select a network, from a plurality of networks, for distributing the distribution data according to the distribution request message, and
transmit, to the network operator device, the distribution data and the distribution policy, and
the network operator device is configured to distribute, to one or more of the plurality of communication devices, the distribution data based on the distribution policy,
wherein when methods for designating distribution data and distribution policies differ from network to network, the service platform is further configured to convert the distribution request message into a method for designating distribution data and a distribution policy for each network, and transmits the method to a corresponding network operator device.

2. The communication system according to claim 1, wherein the distribution policy includes at least one of a distribution area, a distribution target communication device, and a distribution period.

3. The communication system according to claim 1, wherein the network operator device distributes the distribution data to a communication device located in a distribution area.

4. The communication system according to claim 1, wherein the service platform determines the distribution policy based on content of the distribution data.

5. The communication system according to claim 1, wherein the service platform selects, the network for distributing the distribution data, and transmits the distribution policy to a network operator device disposed in the selected network.

6. The communication system according to claim 5, wherein the service platform selects the network for distributing the distribution data based on content of the distribution data.

7. The communication system according to claim 1, wherein the plurality of networks include at least one of a mobile communication network to which a mobile communication device is connected, and a fixed communication network to which a fixed communication device is connected.

8. The communication system according to claim 1, wherein when a change of state in an ambient environment of the communication devices is detected by the communication devices or a sensor, the communication devices transmit the event notification to the application server.

9. The communication system according to claim 1, wherein the service platform determines whether or not to permit distribution of the distribution data according to the distribution data transmitted from the application server, and when the service platform determines to permit the distribution of the distribution data, the service platform transmits the distribution data and the distribution policy to the network operator device.

10. The communication system according to claim 1, wherein the service platform analyzes user data transmitted from the communication devices to the application server at an arbitrary timing, and transmits the distribution data and the distribution policy to the network operator device according to a result of the analysis.

11. A service platform disposed between a network operator device and an application server an application service the service platform comprising:
a memory storing a set of instructions; and
at least one processor configured to execute the instructions to:

acquire a distribution request message including distribution data and a distribution policy from the application server,
    wherein the application server receives an event notification transmitted from a communication device and determines the distribution data and the distribution policy based on the event notification, the distribution policy being used to distribute the distribution data,
transmit, to the network operator device, the distribution data and the distribution policy, and
convert, when methods for designating distribution data and distribution policies differ from network to network, the distribution request message into a method for designating distribution data and a distribution policy for each network, and transmit the method to a corresponding network operator device.

12. The service platform according to claim 11, wherein the at least one processor is further configured to execute the instructions to:
    select, from a plurality of networks, a network for distributing the distribution data, and
    transmit the distribution policy to a network operator device disposed in the selected network.

13. The service platform according to claim 12, wherein the plurality of networks include at least one of a mobile communication network to which a mobile communication device is connected, and a fixed communication network to which a fixed communication device is connected.

14. The service platform according to claim 11, wherein the at least one processor is further configured to execute the instructions to:
    determine whether or not to permit distribution of the distribution data according to the distribution request message transmitted from the application server.

15. The service platform according to claim 11, wherein the at least one processor is further configured to execute the instructions to:
    analyze user data transmitted from the communication device to the application server at an arbitrary timing; and
    transmit the distribution data and the distribution policy to the network operator device according to a result of the analysis.

16. A communication method used in a service platform disposed between a network operator device and an application server that provides an application service the communication method comprising:
    acquiring a distribution request message including distribution data and a distribution policy from the application server,
        wherein the application server receives an event notification transmitted from a communication device and determines the distribution data and the distribution policy based on the event notification, the distribution policy being used to distribute the distribution data,
    transmitting, to the network operator device, the distribution data and the distribution policy, and
    converting, when methods for designating distribution data and distribution policies differ from network to network, the distribution request message into a method for designating distribution data and a distribution policy for each network, and transmitting the method to a corresponding network operator device.

17. The communication method according to claim 16, wherein a network for distributing the distribution data is selected from a plurality of networks prior to transmission of the distribution data and the distribution policy to the network operator device.

18. The communication method according to claim 16, wherein upon receiving, from the application server, the distribution request message including the distribution data and the distribution policy, it is determined whether or not to permit distribution of the distribution data.

19. A non-transitory computer readable medium storing a program which, when executed, causes a computer to perform a communication method, the computer being disposed between a network operator device and an application server that provides an application service the communication method comprising:
    acquiring a distribution request message including distribution data and a distribution policy from the application server,
        wherein the application server receives an event notification transmitted from a communication device and determines the distribution data and the distribution policy based on the event notification, the distribution policy being used to distribute the distribution data,
    transmitting, to the network operator device, the distribution data and the distribution policy, and
    converting, when methods for designating distribution data and distribution policies differ from network to network, the distribution request message into a method for designating distribution data and a distribution policy for each network, and transmitting the method to a corresponding network operator device.

* * * * *